(12) United States Patent
Aznar et al.

(10) Patent No.: US 6,907,007 B2
(45) Date of Patent: Jun. 14, 2005

(54) METHOD OF INJECTING/EXTRACTING CONTROL CELLS IN AN ASYNCHRONOUS TRANSFER MODE (ATM) NETWORK

(75) Inventors: Ange Aznar, La Colle sur Loup (FR); Claude Basso, Nice (FR); Mathieu Girard, Tourrettes sur Loup (FR); Daniel Orsatti, La Gaude (FR); Dominique Rigal, Nice (FR); Jean-Claude Zunino, Nice (FR)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 09/766,074

(22) Filed: Jan. 19, 2001

(65) Prior Publication Data

US 2001/0009549 A1 Jul. 26, 2001

(30) Foreign Application Priority Data

Jan. 24, 2000 (EP) .......................................... 00480018

(51) Int. Cl.$^7$ .............................................. G01R 31/08
(52) U.S. Cl. ................................ 370/236.2; 370/241.1; 370/395.21
(58) Field of Search ............................. 370/236, 236.1, 370/236.2, 241, 241.1, 395.21, 359, 395.3, 395.32, 395.4, 395.5, 252, 395, 235, 248, 410

(56) References Cited

U.S. PATENT DOCUMENTS 6,198,726 B1 * 3/2001 Hayami et al. .......... 370/236.2
6,377,574 B1 * 4/2002 Endo .......................... 370/359

* cited by examiner

*Primary Examiner*—Chau Nguyen
*Assistant Examiner*—Robert W. Wilson
(74) *Attorney, Agent, or Firm*—Daniel E. McConnell

(57) ABSTRACT

A method and system for injecting/extracting a control cell into/from a data connection transmitted from a source switching node to a destination switching node of an Asynchronous Transfer Mode (ATM) network. The injecting method consists in adding to the ATM cell a switch routing label (SRL) and a protocol engine correlator (PEC) by the control point of the injection switching node before injecting the cell into the connection. The extracting method consists in setting a control flag in the control block of the incoming cell if this cell includes an extraction condition indicating that it is a control cell to be extracted, and adding to the control cell a switch routing label corresponding to the control point (CP SRL) and a reserved static protocol engine correlator (SPEC).

16 Claims, 7 Drawing Sheets

METHOD OF INJECTING/EXTRACTING CONTROL CELLS IN AN ASYNCHRONOUS TRANSFER MODE (ATM) NETWORK

BACKGROUND OF THE INVENTION

1. Technical Field

The invention relates generally to Asynchronous Transfer Mode (ATM) networks wherein a source ATM device and a destination ATM device are connected by multiple intermediary network switching nodes, and relates in particular to a method for injecting control cells such as Operation And Maintenance (OAM) cells into the source-to-destination connection at an injection switching node and extracting the control cells from the connection at an extraction switching node.

2. Description of the Related Art

A connection is established in an ATM network from a source ATM device to a destination ATM device by multiple intermediary switching nodes. Incoming cells into a switching node are automatically routed to the next switching node of the connection. To this end, each cell includes an ATM header and a payload. An ATM protocol engine in the switching node identifies an incoming ATM cell utilizing a lookup table.

Upon a determination that an incoming cell is a valid cell ("valid" meaning belonging to an existing connection), the protocol engine performs traffic management functions related to traffic policing, congestion management, priority management, etc., and queues the cell in an appropriate queue. A scheduler utilizes priority-based scheduling procedures to select queues from which cells are transmitted. Upon selection by the scheduler, the cells are dequeued from their respective queues.

Prior to transmission of the cell from the switching node, the protocol engine adds routing labels to the cell including a switch routing label (SRL) and a protocol engine correlator (PEC). A cell formatted in accordance with such labeling by the protocol engine is processed within the switching node and will be referred to hereafter as a "labeled cell".

The SRL contains either the identity of the destination blade explicitly, or a pointer to a translation table located in the switching device that contains the explicit destination blade identity. The PEC is a pointer utilized by the protocol engine of an output adapter of the switching node to identify the connection to which the cell belongs. The protocol engine in the output adapter receives the cell from a switching interface within the switching node. Similar to the input protocol engine, the processing performed by the output protocol engine on the cell includes: identifying the incoming cell by performing a lookup on the appended protocol engine correlator; performing traffic management functions; queueing the cell in the appropriate queues; dequeueing the cell in accordance with a scheduler. In addition, the output protocol engine removes the appended labels, swaps the ATM label, and transmits the cell on the connection to the appropriate destination ATM port(s).

Conventionally, transmitting control cells, such as Operation And Maintenance (OAM) cells, from an ATM switching node to another ATM switching node of the connection, requires transmission of control messages between the two switching nodes using specific hardware resources such a microprocessor dedicated to such a task in each switching node. However, such a solution is inefficient both in terms of cost and overhead devices inasmuch as it requires incorporation of microprocessors on the adapter cards of the switching nodes in addition to the Application Specific Integrated Circuit (ASIC) modules that are utilized to route non-control ATM cells.

SUMMARY OF THE INVENTION

A method and system for injecting a control cell into an Asynchronous Transfer Mode (ATM) data connection between a source ATM device and a destination ATM device are disclosed herein. A control cell is injected into the connection by the control point of an injection switching node. The control cell injection method includes generating a control cell composed of a payload and an ATM header containing the input VP/VC of the connection in order to constitute an ATM cell. A switch routing label (SRL) and a protocol engine correlator (PEC) are added to the control cell to label the control cell. An injection flag is set in the labeled control cell for indicating to the protocol engine of the control point that the cell is a control cell to be injected into the connection.

A second aspect of the invention relates to extracting a control cell from the ATM data connection. The method includes determining within an extraction switching node, whether an incoming cell includes an extraction condition. If the incoming cell includes an extraction condition, a control flag is set in the control block of the incoming cell that indicates that it is a control cell to be extracted. A switch routing label corresponding to the control point (CP SRL) and a reserved static protocol engine correlator (SPEC) are added to the control cell before it is transmitted to the switch of the extraction switching node, such that the cell is extracted on the downside of the switching node.

All objects, features, and advantages of the present invention will become apparent in the following detailed written description.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE PREFERRED EMBODIMENT

Figure 1:
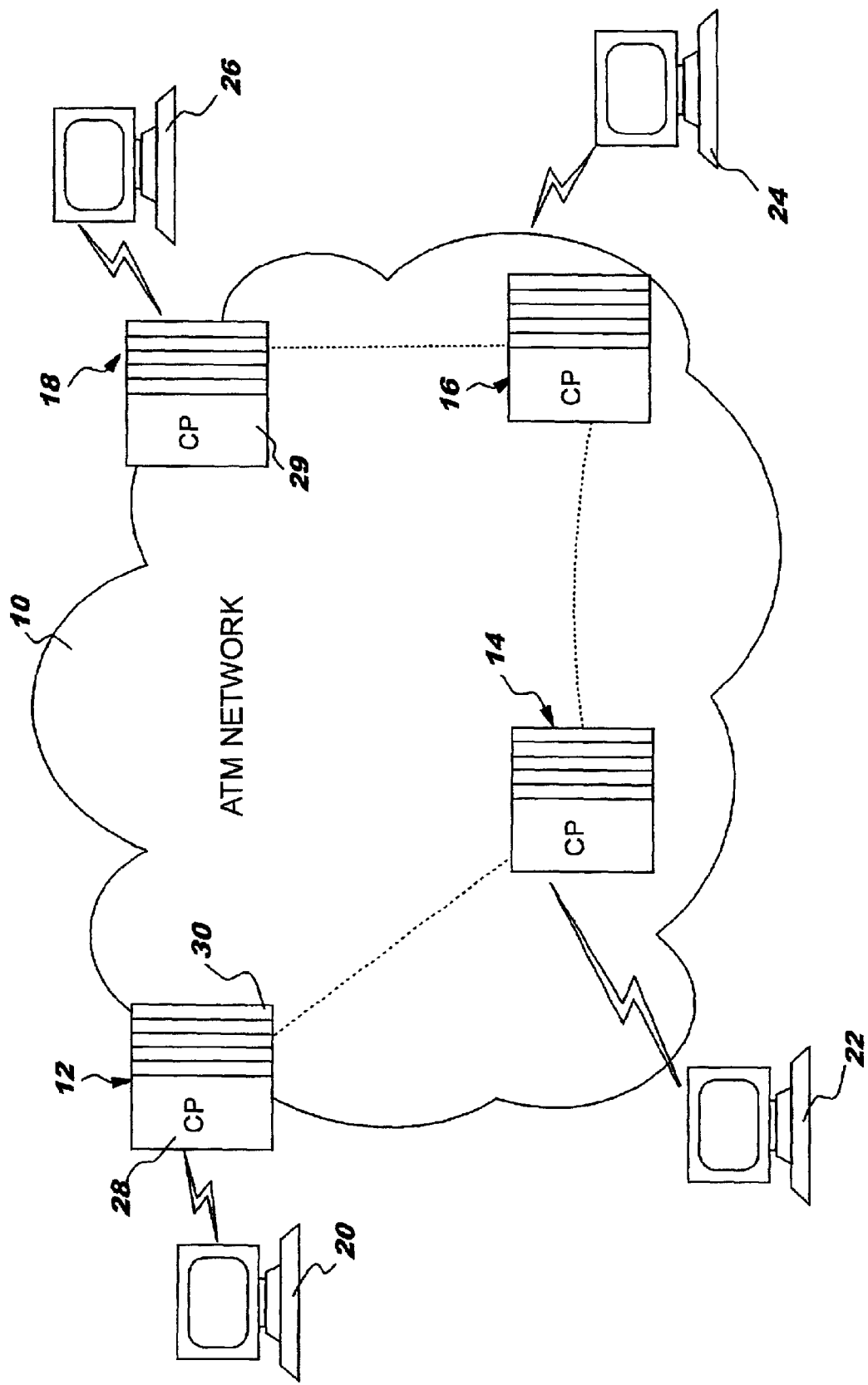
FIG. 1 illustrates an ATM network in which a preferred embodiment of the present invention is applicable.

With reference now to the figures wherein like reference numerals refer to like and corresponding parts throughout, and in particular with reference to FIG. 1 shows an example of an ATM network 10 implementing the system according to the invention, and comprising four switching nodes 12, 14, 16 and 18 being respectively connected to local consoles 20, 22, 24 and 26. Each switching node is composed of a Control Point (CP) blade such as CP blades 28 of switching node 12, a plurality of adapter blades such as adapter blade 30 in node 10, which provide the physical attachments to network devices such as the other switching nodes or the user workstations and a switch fabric providing cell switching between its ports on which are attached the adapter blades. The local console attached to the CP blade in each node is used for the network and control management.

It is assumed that a connection is established between a source ATM device attached to switching node 12 and a destination ATM device attached to switching node 18 through intermediary switching nodes 14 and 16. According to the principles of the invention, control cells can be injected into this connection by control point 28 of node 12 and can be extracted by control point 29 of node 18, utilizing extant hardware resources included in each of said nodes. It must be noted that the control cells could also be injected by a control point of any intermediary switching node such as node 14, and could be extracted by any subsequent intermediary switching node such as node 16.

Figure 2:
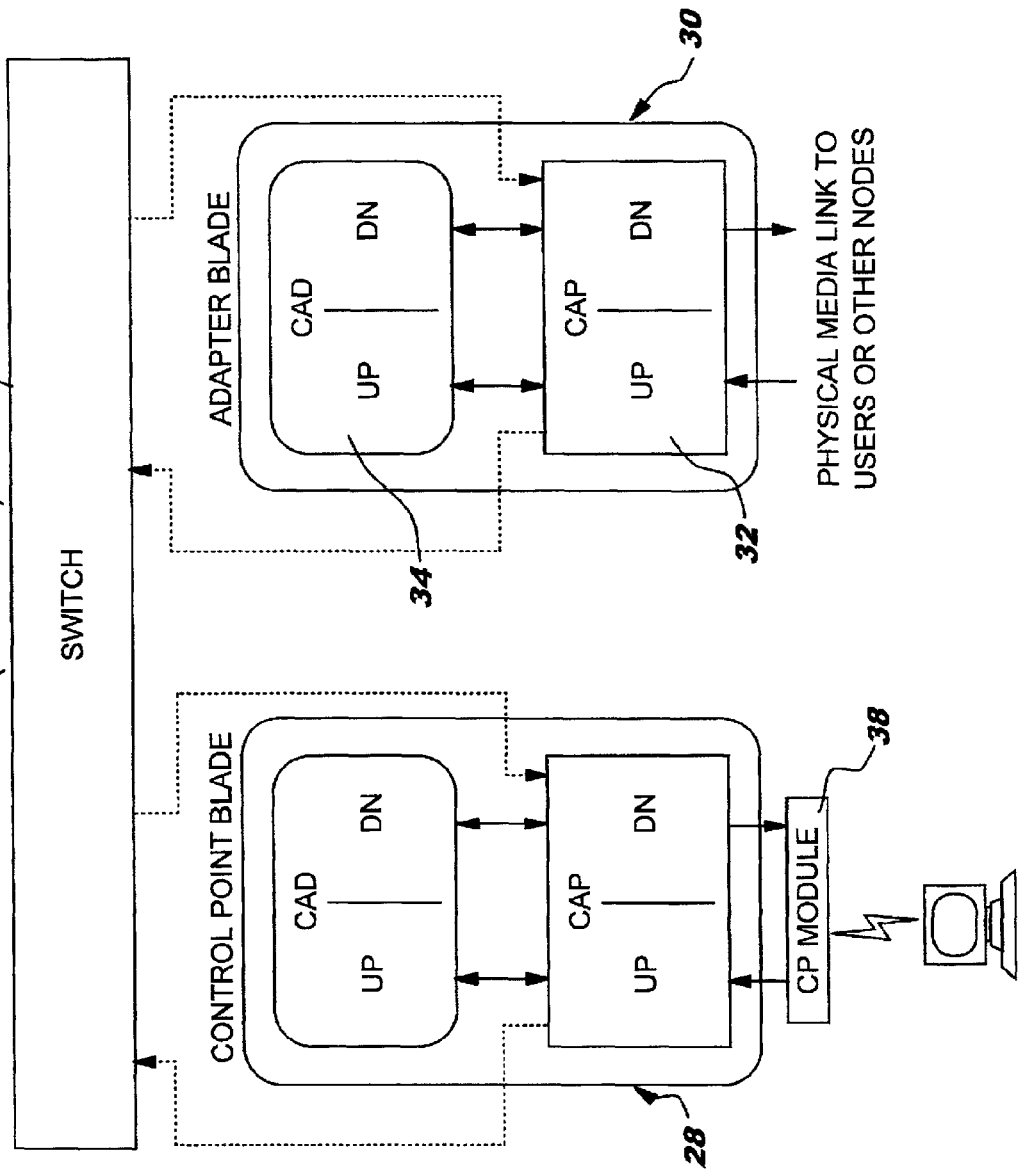
FIG. 2 is a block diagram depicting a switching node in which a preferred embodiment of the present invention is applicable.

With reference now to FIG. 2, there is illustrated a block diagram depicting a switching node in which a preferred embodiment of the present invention is applicable. Specifically, FIG. 2 shows the internal s structure of each switching node, each adapter blade 30, and each CP blade 28. As depicted in FIG. 2, the adapter blades and CP blades share the same flow structure. One of the two ASIC modules used in each blade is a Common ATM Data mover (CAD) module 32 which performs functions related to the data flow. The other ASIC device is a Common ATM Processor (CAP) module 34 that performs the necessary ATM processing. As illustrated in FIG. 2, each CAD 34 is connected to a switch device 36.

Each of CAD modules 34 and CAP modules 32 is split into two parts, an UP side for the receive flow and a DN side for the transmit flow. The CAD UP side receives data from transmitted from physical links and stores them in a data storage. For each cell received, CAD UP exchanges information such as VP, VC and cell buffer ID with the CAP UP for cell processing. The CAP UP sends back information needed to forward the cell through switch 36 via the CAD UP. This cell forwarding information is found in a control storage delivered by the CAP UP side. Note that switch 36 connects blades UP to blades DOWN and forwards cells from an input port to an output port.

The CAD DN side receives data from switch 36 and stores it in a data storage. For each cell received, the CAD DN side exchanges information such as Protocol Engine Correlator (PEC) and cell buffer ID with the CAP DN for cell processing. The CAP DN side returns information needed to forward the cell to the correct destination port and ATM connection via the CAD DN side. CP blades includes the same structure as adapter blades, wherein the control point is an ATM device of the ATM network.

Figure 3:
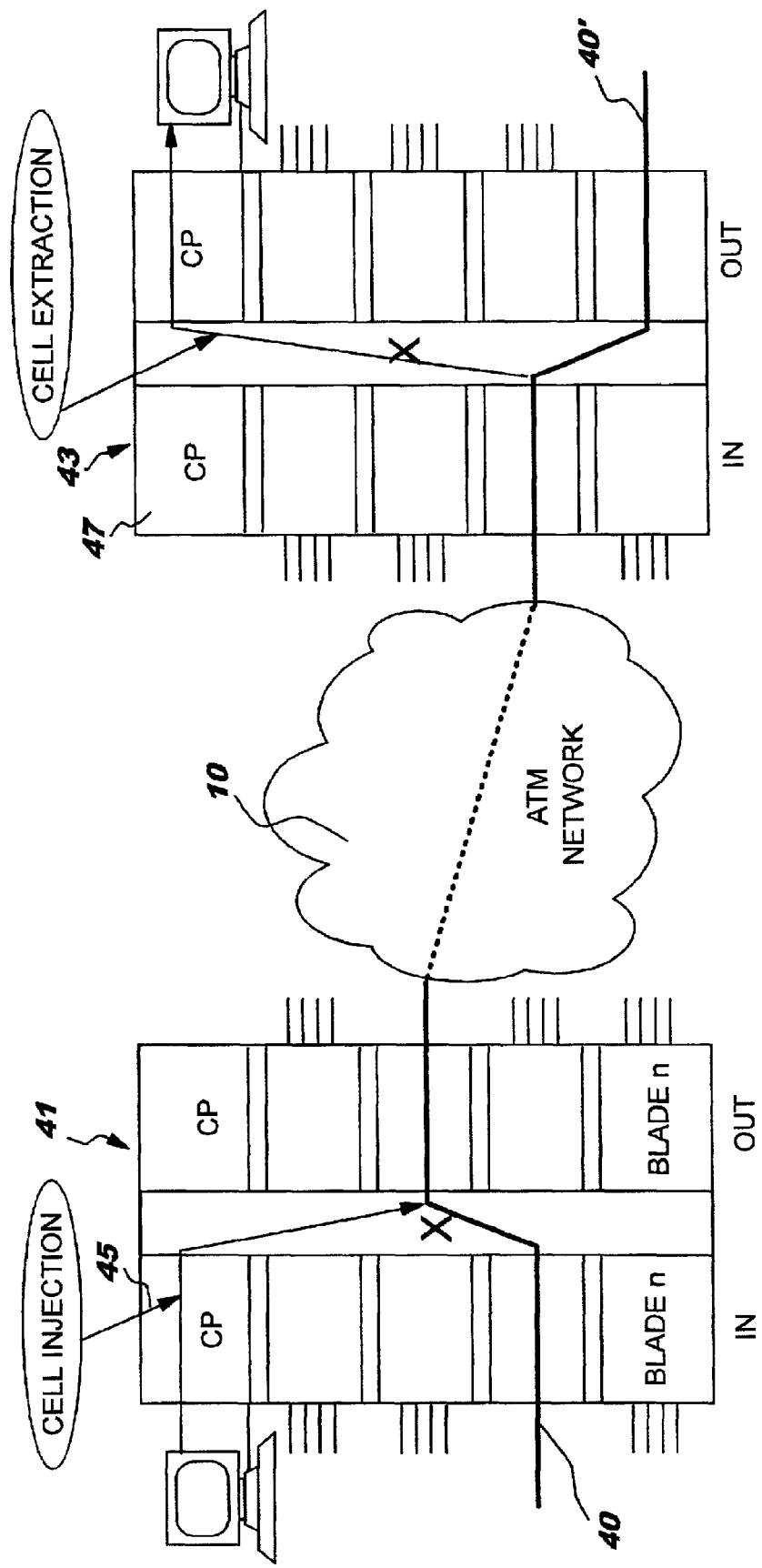
FIG. 3 illustrates a cell injection system and a cell extraction system in accordance with a preferred embodiment of the present invention.

Turning now to FIG. 3, there is illustrated a cell injection system and a cell extraction system in accordance with a preferred embodiment of the present invention. As shown in FIG. 3, an ATM connection 40–40' is setup from a first switching node 41 called the injection node to a second switching node 43 called the extraction node through an ATM network 10. The injection of control cells into ATM connection 40–40' is performed by a control point 45 of injection node 41 while extraction of the control cells is performed near a control point 47 of extraction node 43.

Figure 4:
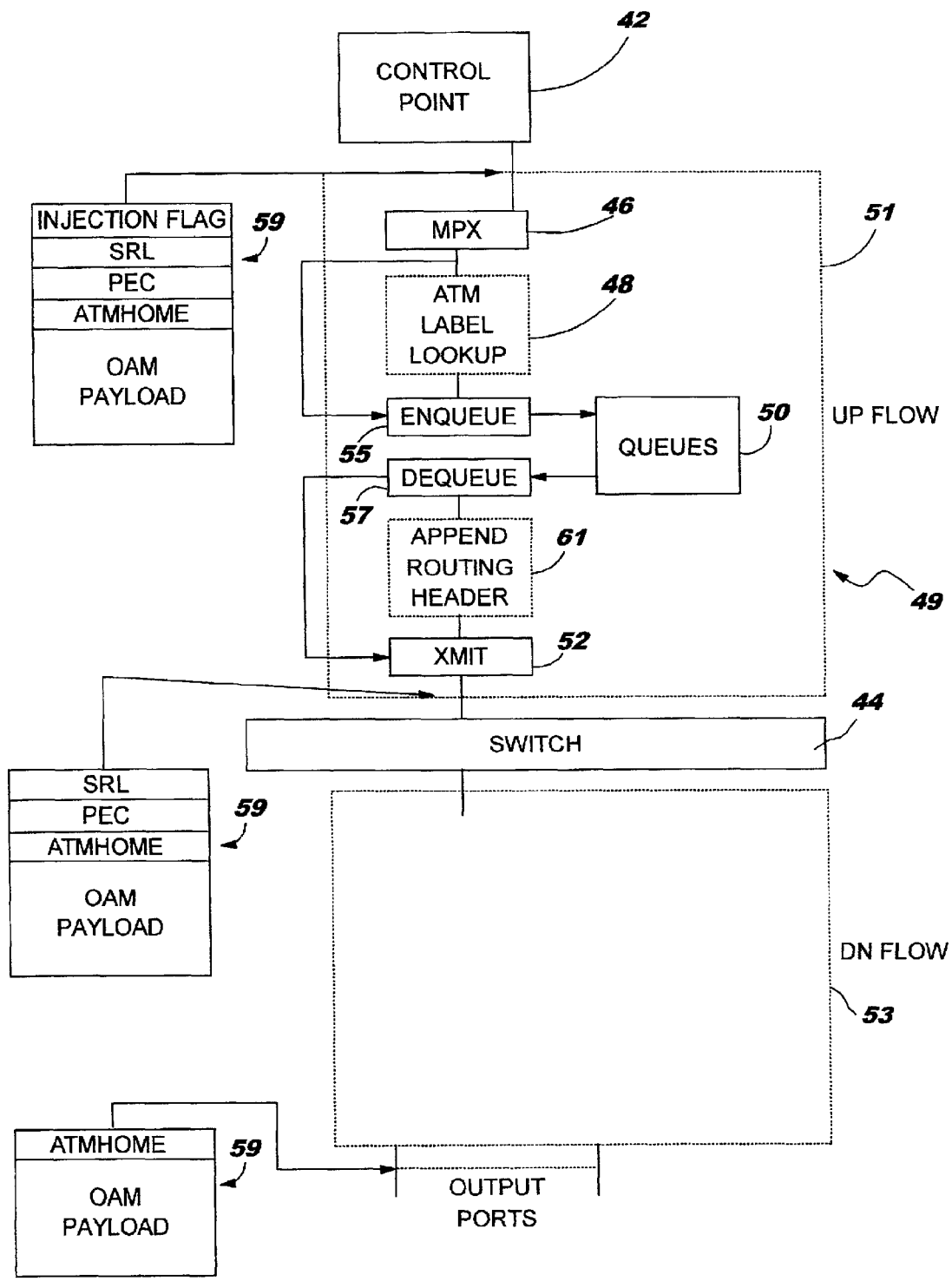
FIG. 4 is a block diagram depicting a system for injecting a control cell within an injection switching node in accordance with a preferred embodiment of the present invention.

With reference now to FIG. 4, there is illustrated a block of a control cell injection system in accordance with a preferred embodiment of the present invention. The control cell injection system depicted in FIG. 4 is utilized for injecting an OAM control cell 59 in a particular ATM connection at an injection switching node 49. The particular ATM connection is characterized within injection switching node 49 by the input port address in the switching node, the input ATM label (VP-VC in), the output port in the switching node, and the output ATM label (VP-VC out).

When a non-control ATM cell belonging to the ATM connection is received by an input blade of injection switching node 49, an input protocol engine 51 identifies the incoming cell using a lookup table 48 with the input port and input ATM label designation of the cell. The lookup returns relevant traffic parameters and routing parameters. Such routing parameters comprise a Switch Routing Label (SRL) processed by a switch device 44 of injection switching node 49 to route the cell to an appropriate output blade and a Protocol Engine Correlator (PEC) that is utilized by an output protocol engine 53 of the designated output blade to identify the cell received from switch device 44.

To inject OAM cell 59 (or any type of other control cells known to the person skilled in the art such as Resource Management (RM) cells) on the ATM connection, a CP 42 transmits OAM cell 59 and labels OAM cell 59 with the following: an input VPI-VCI of the designated ATM connection; the routing labels of the defined connection (SRL and PEC); the Payload Type Indicator (PTI) field of the ATM header defining the cell as an OAM cell (respectively RM cell); and a flag indicating the cell is an injected cell.

In response to receiving input OAM control cell 59 generated and characterized by CP 42, input protocol engine 51 (located within the control point blade) reads the injection flag and bypasses ATM label lookup 48 in response thereto. The injection flag is encoded into and read from the header of the labeled control cell. After bypassing ATM lookup 48, protocol engine 51 performs an enqueue function 55 in which the labeled control cell is assigned into queues 50 and a dequeue function 57 is performed. Then, the injection flag is again read by protocol engine 51 to bypass the routing label appending function 61. OAM cell 59 is thus directly transferred to a XMIT unit 52 for transmission to switch 44. Prior to transmitting OAM cell 59 to switch 44 protocol engine 51 removes the injection flag from the header of OAM cell 59.

Upon receipt by switch 44, OAM cell 59 has exactly the same processing information in its header as a conventional non-control ATM cell within the ATM connection, except that this information (SRL, PEC) has been assigned by control point 42 of injection node 49. After being switched through the switch fabric of switch device 44, the data flow process utilized to process the injected OAM cell is the same as that utilized for non-control ATM traffic cells. As shown in FIG. 4, upon transmission from an output port of protocol engine 53 to the ATM network, OAM cell 59 includes the OAM payload and the swapped label (ATMH OAM).

Figure 5A:
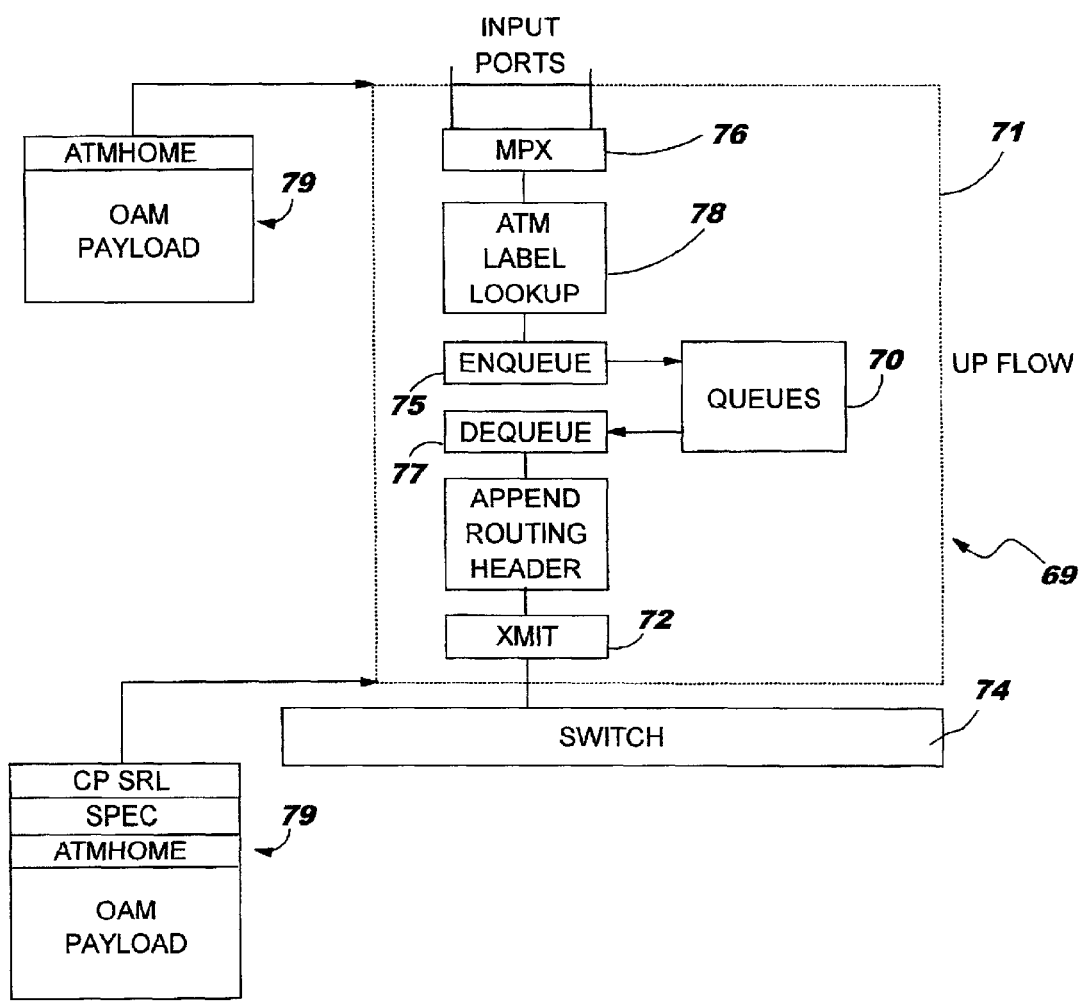
FIGS. 5A and 5B are block diagrams illustrating a system for processing and extracting a control cell within an extraction switching node in accordance with a preferred embodiment of the present invention.
Figure 5B:
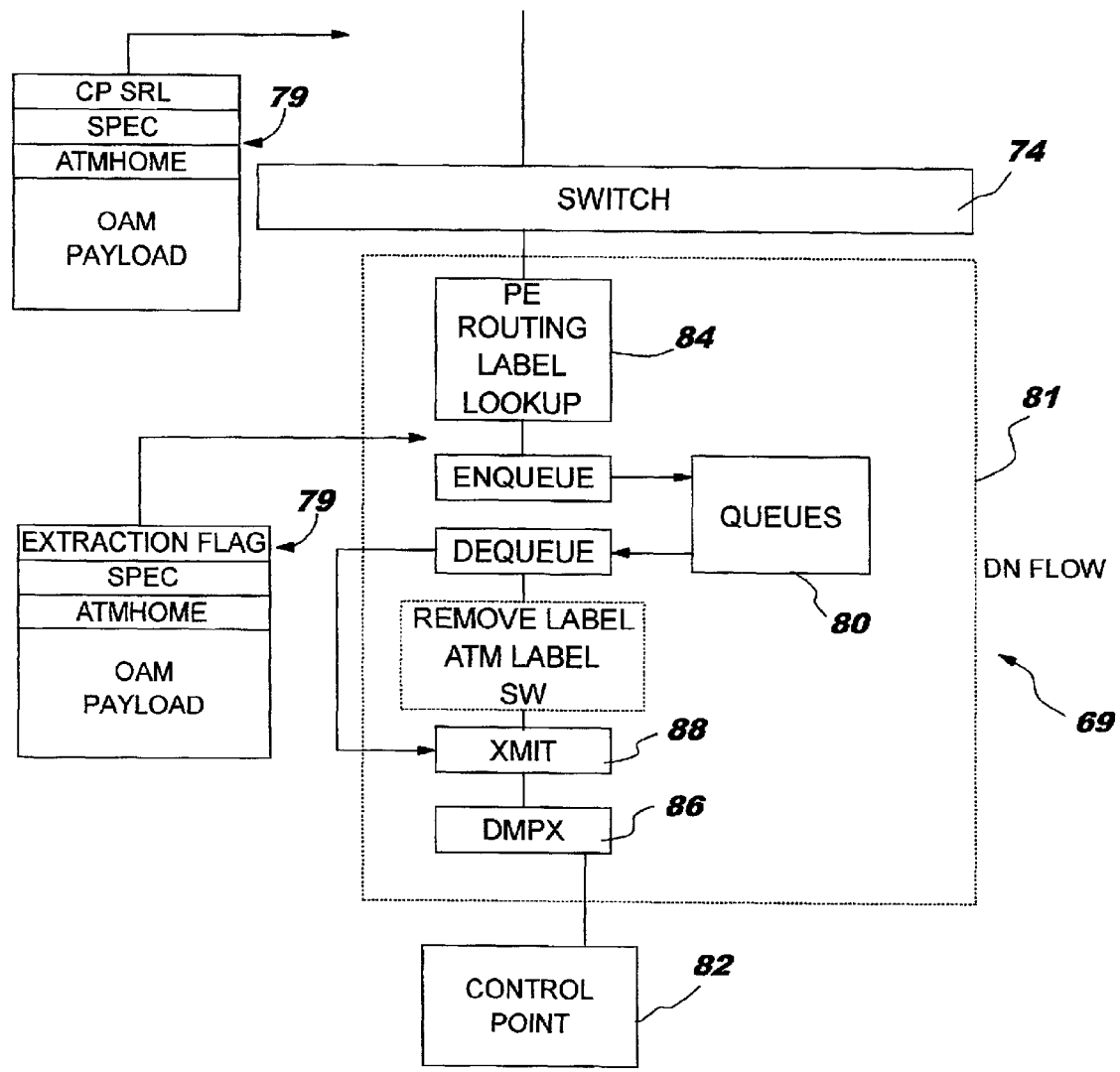

Turning now to FIGS. 5A and 5B, block diagrams are utilized to illustrate a control cell processing system in accordance with a preferred embodiment of the present invention. During initialization of a switching node 69, a CP (not depicted) within switching node 69 determines and defines multiple static routes from all input ports of switching node 69 that lead to the control point. In doing so, the CP defines two static parameters for all input blades of switching node 69 including the following: the SRL (referred to hereinafter as CP_SRL) that corresponds to the output blade to which the control point is attached (this parameter is common to all blades), and a blade identifier (referred to hereinafter as B_id), that is, in accordance with a preferred embodiment of the invention, the encoded value of the blade (this parameter is blade-specific).

The blade identifier will be used by a protocol engine 71 of an input blade to generate a particular PEC that will be denominated hereinafter as a Static PEC (SPEC). The SPEC is encoded with the identity of the input blade (B_id) and the identity of an input port in the input blade. For example, a possible SPEC encoding may take the form: SPEC=b'00 0000 00PP BBBB' where BBBB=B_Id and PP=encode_port. Such encoding permits the CP of switching node 69 to account for possible intra-node routes formed from 16 blades, wherein each blade includes 4 ports, and that standard PECs are 14 bits wide. One skilled in the art will recognize that any alternate encoding may be chosen without departing from the scope of the invention.

The CP then reads a PEC table of the output blade to which the CP is attached to identify table entries that corresponding to the SPECs utilized in switching node 69. In the previous SPEC example, the CP designates 64 entries in the PEC table corresponding to the 64 static routes from any of the 64 ports of switching node 69 to control point 82. Each of the SPEC entries specifies that the cell received with the particular PEC has been extracted. This extraction information will be utilized, as shown hereafter by an output protocol engine 81 of CP blade 82, to modify its conventional ATM traffic cell processing when handling an extracted cell. It is important to note that the SPECs can not be utilized by ATM connections within CP blade 82 (the SPECs are dedicated and statically allocated to the extraction process).

When an ATM cell 79 is received at an input port in an input adapter of extraction switching node 69, protocol engine 71 determines whether cell 79 is to be extracted. In making such a determination, various extraction conditions may be used, the simplest being a per connection flag indicating that all received OAM cells of the connection are to be extracted. Protocol engine 71 sets a control flag in the control header of cell 79 to be extracted and performs its regular process from MPX unit 76 to XMIT unit 72. However, instead of appending the labels conventionally utilized for ATM user traffic as found in the connection control blocks, protocol engine 71 appends a SRL corresponding to the switch output port to which the control point is connected (CP_SRL) and further appends a reserved Static Protocol Engine Correlator (SPEC) using the Blade identifier B_Id information to the extracted OAM cell 79.

In contrast to the dynamic process by which the conventional connections are established, CP 82 establishes static paths during initialization of switching node 69. Thus, CP 82 defines for each input adapter, a register that contains a designated SRL (CP SRL) which provides a path to reach CP 82. In addition, CP 82 designates a particular SPEC identifying the input adapter. When cell 79 is transferred by XMIT unit 72 to switch 74, it includes the CP SRL and the SPEC as a header for the OAM payload as illustrated in FIG. 5A.

Switch 74 routes labeled cell 79 to the CP adapter as illustrated in FIG. 5B. Protocol engine 81 performs the routing label (PEC) lookup function 84, resulting in a determination by protocol engine 81 that cell 79 has been extracted to CP 82 (this extraction information is written by CP 82 in the entries of lookup table 84 that correspond to the reserved labels used to extract the cells). Protocol engine 81 then flags cell 79 by setting an extraction flag in the cell header. After queuing and dequeuing by means of queues 80, the extraction flag is used by protocol engine 81 to bypass the remove routing label/ATM label swap function and deliver cell 79 directly to XMIT unit 88 so that cell 79 is received by CP 82 after DMPX unit 86 containing only the incoming ATM label (input VP/VC) and the source and input adapter identifications encoded in the SPEC. This labeling allows CP 82 to identify the connection to which the received extracted cell belongs.

Figure 6:
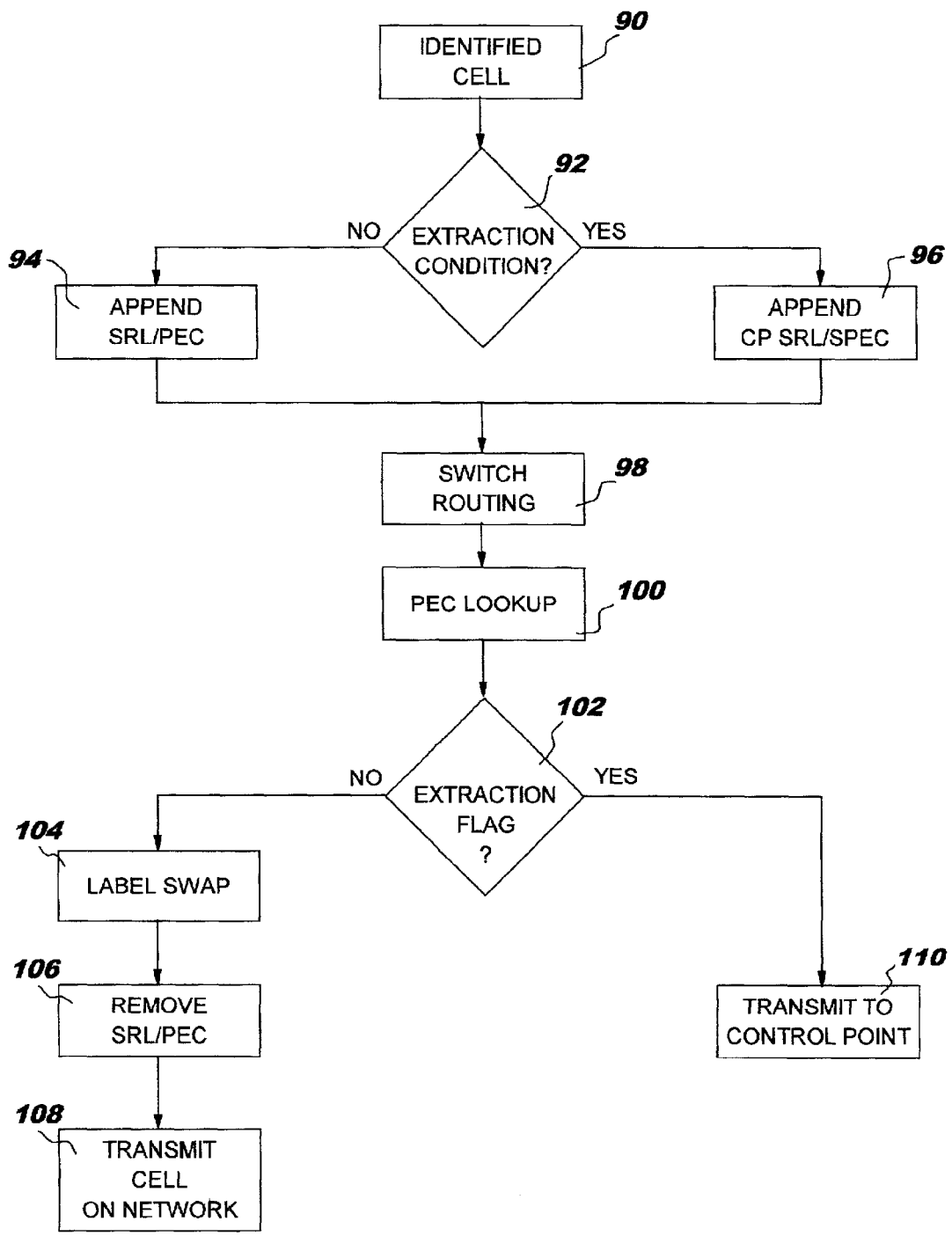
FIG. 6 is a flow diagram depicting the sequential steps of the process implemented for processing a previously injected control cell in accordance with a preferred embodiment of the present invention.

With reference now to FIG. 6, there is depicted a flow diagram representing the sequential steps of the process implemented for processing a previously injected control cell in accordance with a preferred embodiment of the present invention. When a cell has been identified (step 70) by the protocol engine of the input adapter (if not identified the cell is discarded), it is checked to determine whether or not the cell is to be extracted as a control cell (step 72). If not, the switch routing label (SRL) and the protocol engine correlator (PEC) of the connection to which the cell belongs are appended to the cell as for all traffic cells (step 74). If the extraction condition exists, a special switch routing label to the control point of the switching node (CP SRL) and a reserved static protocol engine correlator (SPEC) are appended to the cell (step 76).

In any case, the cell is then routed by the switch of the switching node (step 78) and in the output blade, a PEC lookup is performed (step 80) whose result indicates wether or not the cell contains an extraction flag (step 82). If not, the cell is processed regularly: a label swap is performed (step 84) and the routing labels (SRL and PEC) are removed (step 86) prior to cell transmission (step 88). Otherwise, the cell is transmitted to the control point of the switching node (step 90) with its header including CP SRL and SPEC (encoding the source port and the source blade) which have not been removed as in a normal cell and are used by the control point to identify the connection from which the cell was extracted.

While the invention has been particularly shown and described with reference to a preferred embodiment, it will be understood by those skilled in the art that various changes in form and detail may be made therein without departing from the spirit and scope of the invention.

What is claimed is:

1. A method for injecting a control cell into an established Asynchronous Transfer Mode (ATM) data connection between a source device and a destination device, wherein said control cell is injected into said connection by a control point of an infection switching node, said method comprising:

generating a control cell composed of a payload and an ATM header containing an input Virtual Path/Virtual Circuit of said connection in order to constitute an ATM cell;

encoding a switch routing label (SRL) and a protocol engine correlator (PEC) within said control cell;

setting an injection flag within said control cell for indicating to an input protocol engine of said control point that said control cell is to be injected into said connection, said input protocol engine identifying incoming cells by performing a label lookup;

reading said injection flag within said protocol engine; and bypassing said label lookup in view of said injection flag.

2. The method of claim 1, wherein said protocol engine appends routing labels to non-control ATM traffic cells, and wherein said method further comprises:

reading said injection flag within said protocol engine; and bypassing said routing label append function in view of said injection flag.

3. A method for extracting a control cell from an established Asynchronous Transfer Mode (ATM) data connection setup between a source device and a destination device, wherein said control cell is extracted from said connection by a control point of an extraction switching node, said method comprising:

determining within said extraction switching node whether or not an incoming control cell includes an extraction condition;

setting a control flag within said incoming control cell in response to said cell including an extraction condition, such that said extraction switching node recognizes and extracts said incoming cell; and within an input adapter and prior to transmitting said control cell to a switch:
adding a control point switch routing label to said control cell, wherein said switch routing label corresponds to said control point; and
adding a reserved static protocol engine correlator to said control cell.

4. The method of claim 3, wherein said control point switch routing label and adding a static protocol engine correlator are loaded into a register of said input adapter during initialization of said extraction switching node.

5. The method of claim 4, wherein said static protocol engine correlator is generated by encoding the identity of said input adapter and the identity of the input port at which said control cell is received in said input adapter.

6. A method for extracting control cell from an established Asynchronous Transfer Mode (ATM) data connection setup between a source device and a destination device, wherein said control cell is extracted from said connection by a control point of an extraction switching node, said method comprising:
determining within said extraction switching node whether or not an incoming control cell includes an extraction condition;
setting a control flag within said incoming control cell in response to said cell including an extracting condition, such that said extraction switching node recognizes and extracts said incoming cell;
switching said control cell across a switch within said extraction switching node; and
setting an extraction flag in said control cell after said switching step.

7. The method of 6, further comprising setting said extraction flag in response to a routing label lookup within an output protocol engine.

8. The method of 7, wherein said output protocol engine performs label swapping for outgoing cells, said method further comprising:
reading said extraction flag; and
bypassing said label swapping in view of said extraction flag, such that said control cell includes an input Virtual Path/Virtual Circuit and source and input adapter identifications.

9. A system for injecting a control cell into an established Asynchronous Transfer Mode (ATM) data connection between a source device and a destination device, wherein said control cell is injected into said connection by a control point of an injection switching node, said system comprising:
processing means for generating a control cell composed of a payload and an ATM header containing an input Virtual Path/Virtual Circuit of said connection in order to constitute an ATM cell;
processing means for encoding a switch routing label (SRL) and a protocol engine correlator (PEC) within said control cell; and
processing means for setting an injection flag within said control cell for indicating to an input protocol engine of said control point that said control cell is to be injected into said connection, said input protocol engine identifying incoming cells by performing a label lookup;
processing means for reading said injection flag within said protocol engine; and
processing means for bypassing said label lookup in view of said injection flag.

10. The system of claim 9, wherein said protocol engine appends routing labels to non-control ATM traffic cells, and wherein said system further comprises:
processing means for reading said injection flag within said protocol engine; and
processing means for bypassing said routing label append function in view of said injection flag.

11. A system for extracting a control cell from an established Asynchronous Transfer Mode (ATM) data connection setup between a source device and a destination device, wherein said control cell is extracted from said connection by a control point of an extraction switching node, said system compromising:
processing means for determining within said extraction switching node whether or not an incoming control cell includes an extraction condition; and
processing means for setting a control flag within said incoming control cell in response to said cell including an extraction condition, such that said extraction switching node recongnizes and extracts said incoming cell;
processing means within an input adapter for adding a control point switch routing label to said control cell, wherein said switch routing label corresponds to said control point; and
processing means within the input adapter for adding a reserved static protocol engine correlator to said control cell.

12. The system of claim 11, wherein said control point switch routing label and adding a static protocol engine correlator are loaded into a register of said input adapter during initialization of said extraction switching node.

13. The system of claim 12, further comprising processing means for encoding the identity of said input adapter and the identity of the input port at which said control cell is received in said static protocol engine correlator.

14. A system for extracting a control cell from an established Asynchronous Transfer Mode (ATM) data connection setup between a source device and a destination device, wherein said control cell is extracted from said connection by a control point of an extraction switching node, said system comprising:
processing means for determining within said extraction switching node whether or not an incoming control cell includes an extraction condition; and
processing means for setting a control flag within said incoming control cell in response to said cell including an extraction condition, such that said extraction switching node recognizes and extracts said incoming cell;
processing means for switching said control cell across a switch within said extraction switching node; and
processing means for setting an extraction flag in said control cell after said control cell has been switched.

15. The system of claim 14, further comprising processing means for setting said extraction flag in response to a routing label lookup within an output protocol engine.

16. The system of 15, wherein said output protocol engine performs label swapping for outgoing cells, said system further comprising:
processing means for reading said extraction flag; and
processing means for bypassing said label swapping in view of said extraction flag, such that said control cell includes an input Virtual Path/Virtual Circuit and source and input adapter identifications.

* * * * *